United States Patent
Carloff et al.

(10) Patent No.: US 8,148,480 B2
(45) Date of Patent: Apr. 3, 2012

(54) STIRRED-TANK REACTOR AND METHOD FOR CARRYING OUT A POLYMERISATION REACTION USING SAID TYPE OF STIRRED-TANK REACTOR

(75) Inventors: Ruediger Carloff, Darmstadt (DE); Joachim Heid, Fraenkisch-Crumbach (DE); Olaf Pickenaecker, Lampertheim (DE)

(73) Assignee: Evonik Roehm GmbH, Darmstadt (DE)

( * ) Notice: Subject to any disclaimer, the term of this patent is extended or adjusted under 35 U.S.C. 154(b) by 0 days.

(21) Appl. No.: 12/865,294

(22) PCT Filed: Nov. 28, 2008

(86) PCT No.: PCT/EP2008/066387
§ 371 (c)(1),
(2), (4) Date: Aug. 12, 2010

(87) PCT Pub. No.: WO2009/106173
PCT Pub. Date: Sep. 3, 2009

(65) Prior Publication Data
US 2011/0028663 A1    Feb. 3, 2011

(30) Foreign Application Priority Data

Feb. 28, 2008 (DE) .......................... 10 2008 000 432

(51) Int. Cl.
*C08F 2/00* (2006.01)
*B01J 19/18* (2006.01)
*B01F 15/02* (2006.01)

(52) U.S. Cl. ........... 526/88; 526/918; 422/135; 366/194
(58) Field of Classification Search ................. 526/88, 526/918; 422/135; 366/194
See application file for complete search history.

(56) References Cited

U.S. PATENT DOCUMENTS

| 4,985,208 | A | 1/1991 | Sugawara et al. |
| 6,977,310 | B2 | 12/2005 | Ackermann et al. |
| 7,745,552 | B2 * | 6/2010 | Kiss et al. ..................... 526/88 |
| 2008/0242782 | A1 | 7/2008 | Hager et al. |

OTHER PUBLICATIONS

U.S. Appl. No. 12/918,952, filed Aug. 23, 2010, Carloff et al.

* cited by examiner

*Primary Examiner* — Fred M Teskin
(74) *Attorney, Agent, or Firm* — Oblon, Spivak, McClelland, Maier & Neustadt, L.L.P.

(57) ABSTRACT

The invention relates to a stirred-tank reactor and to a method for carrying out a polymerization reaction of unsaturated monomers using a stirred-tank reactor. According to the invention, said stirred-tank reactor is characterized in that the product discharge point is designed as the central base outlet that is at least partially traversed by the agitator shaft. Said polymerization is performed continuously under positive pressure, so that the stirred-tank reactor is operated hydrodynamically.

20 Claims, 2 Drawing Sheets

Reactor with metering points

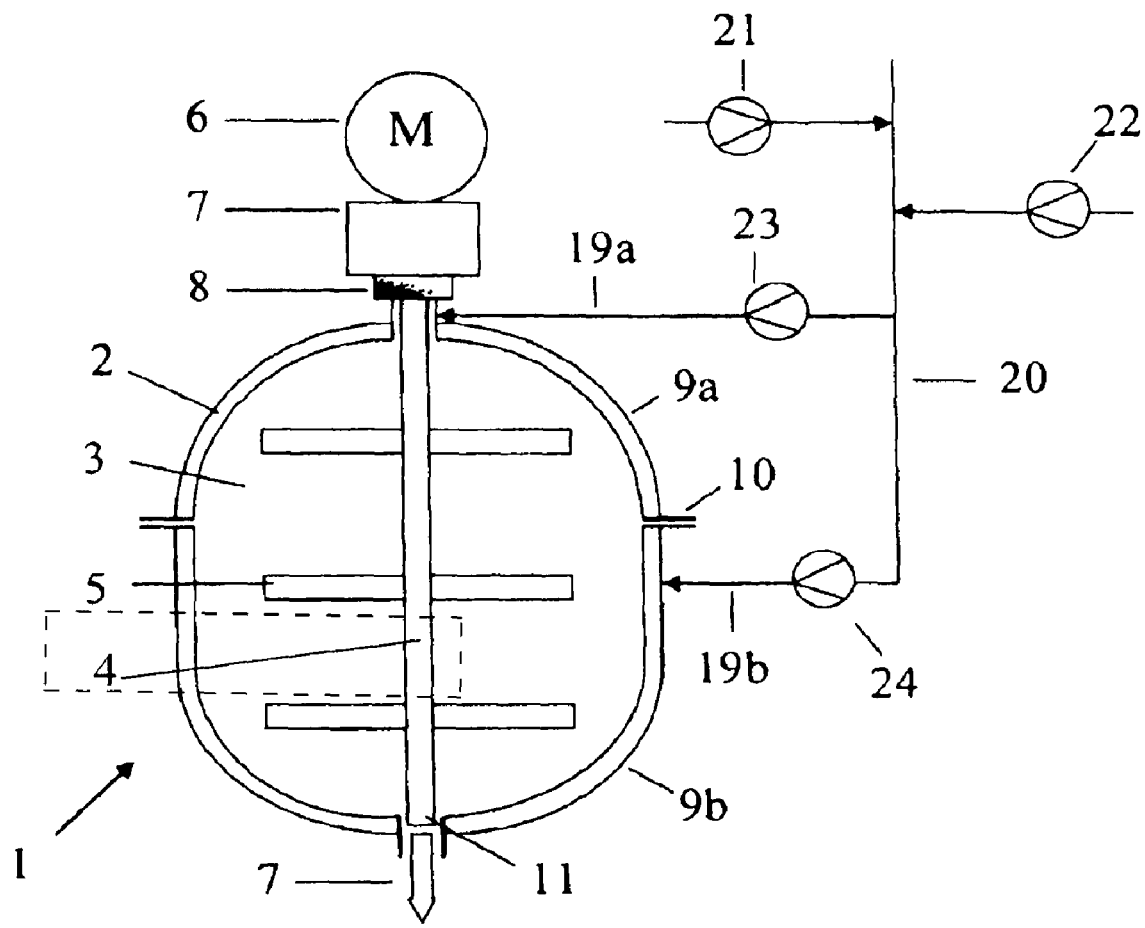
Figure 1: Reactor with metering points

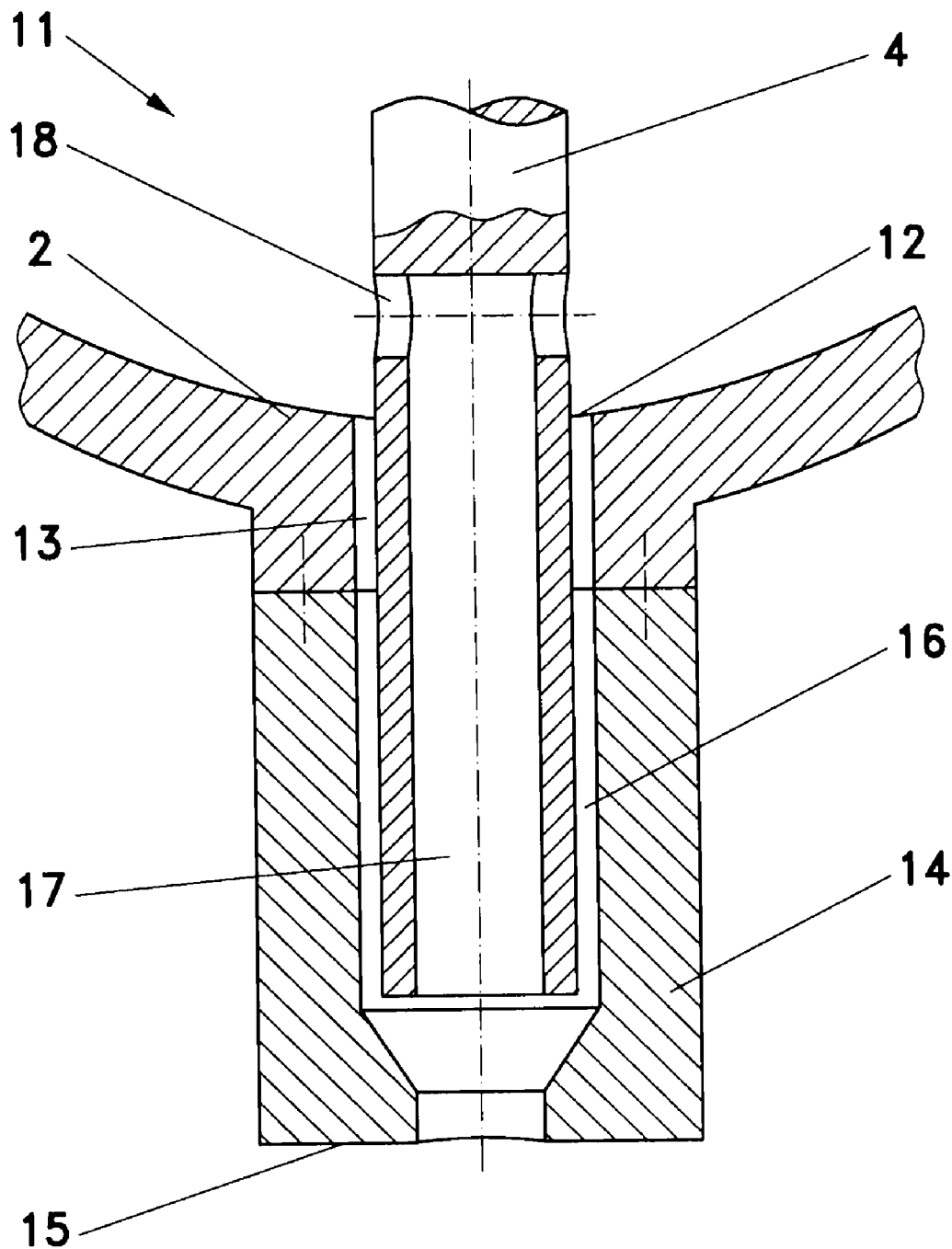
Figure 2: Step bearing

STIRRED-TANK REACTOR AND METHOD FOR CARRYING OUT A POLYMERISATION REACTION USING SAID TYPE OF STIRRED-TANK REACTOR

FIELD OF THE INVENTION

The invention relates to a continuously operated stirred-tank reactor, in particular for the preparation of polymers from unsaturated monomers, comprising a preferably thermostatable reactor jacket, at least one driven stirrer shaft and stirring and/or shearing elements nonrotatably connected to the stirrer shaft, comprising at least one starting material feed which is preferably at the top in the position of use and at least one product discharge which is preferably at the bottom in the position of use. The invention furthermore relates to a process for carrying out a polymerisation reaction from unsaturated monomers using a stirred-tank reactor of the type described above.

PRIOR ART

A stirred-tank reactor of the abovementioned type for carrying out polymerisation reactions in highly viscous reaction media and at high reaction rates is disclosed, for example, in DD 294 426 A5. The stirred-tank reactor described there has a thermostatable reactor jacket and a rotor arranged centrosymmetrically in the reactor. The rotor comprises a rotor shaft, a yoke having passages and a stirrer cylinder which is open at the top and bottom and extends in the axial direction of the rotor shaft from the bottom of the reactor to the reactor cover. The annular space between the stirrer cylinder and the reactor jacket and the annular space between the stirrer cylinder and the inserted tube are provided with helical stirrers. The stirrer cylinder has a yoke having passages. The mixing elements are arranged between the passages on and below the yoke. The mixing and homogenisation of the reaction mass and the heat removal are said to be improved by the particular arrangement of the passages on the yoke of the stirrer cylinder or the mixing elements.

In particular, transport of the product stream is achieved by the formation of the mixing elements as helical stirrers.

The stirred-tank reactor according to DD 294 426 A5 is designed so that the reactor can be operated only when completely full. The mixing elements must be arranged so that deposits on the reactor cover are avoided. Moreover, the mixing elements must be designed so that effective conveying of the product stream can be achieved.

In particular, partial filling in the case of continuously operated reactors has the disadvantage that polymer deposits may occur in the gas-filled, upper container region. In the case of partly filled continuously operated reactors, discharge pumps are typically required which, particularly at high outputs of several 1000 kg/h of viscous liquid, are very expensive due to their size. During start-up and run-down of the reactor, the reactor content usually has to be discharged with a very different viscosity compared with stationary operation. The discharge pump can very rapidly become blocked, in particular at low viscosities, owing to a lack of lubrication.

Known continuously operated stirred-tank reactors are frequently operated when only partly full. For such operation of a stirred-tank reactor, level-measuring apparatuses are required. These in turn are relatively susceptible to faults owing to the formation of polymer deposits.

Patent DE 3 338 736 A1 describes a polymerisation process in which completely filled stirred-tank reactors are used. It is true that caking on the upper reactor walls and poor mixing in of the monomer condensate flowing back are prevented thereby. However, metering is not effected directly below the axial face seal so that accumulations of polymer may occur there and may finally lead to failure of the stirrer. Since operation is effected with only slight superatmospheric pressure, expensive and high-maintenance gear pumps, which exhibit considerable wear at low viscosities and may fail, are moreover used at the bottom of the reactor. Furthermore, the stirrer has no step bearing so that the shaft has to be made stronger and the stirrer is sensitive to imbalances due to accumulations of polymer.

Patent EP 1 122 265 B1 describes a polymerisation reactor which has a plurality of inlets for starting materials. However, none of the feeds is used for flushing the region of the axial face seal, so that the disadvantages described may occur.

The patent RU 2114869 C1 describes a continuous mass polymerisation process in which completely filled stirred-tank reactors are used. However, here too, metering in is not effected in the vicinity of the axial face seal and no step bearing is used, with the result that the abovementioned adverse effects are likewise to be expected. Recycled, cooled polymer solution is fed into the reactor at a second metering point without initiator being admixed. Consequently, no substantially improved homogeneity of the initiator concentration in the reactor is produced thereby.

OBJECT

It is therefore the object of the invention to provide a simply designed stirred-tank reactor of the type mentioned at the outset, which can be operated continuously and when completely full by simple means. In particular, the reactor should be designed so simply that it is possible to dispense with expensive syrup pumps for highly viscous liquids and with level regulation.

Furthermore, the starting materials fed in should be mixed into the viscous reaction mixture in the reactor and homogeneously distributed as rapidly as possible.

Achievement

The object is achieved, according to the invention, by a continuously operated stirred-tank reactor, in particular for the preparation of polymers from unsaturated monomers, comprising a reactor jacket which in particular is thermostatable, at least one driven stirrer shaft and stirring and/or shearing elements nonrotatably connected to the stirrer shaft, comprising at least one starting material feed which is at the top in the position of use and at least one product discharge which is at the bottom in the position of use, the stirred-tank reactor according to the invention being distinguished in particular in that the product discharge is in the form of a central bottom outflow through which the stirrer shaft at least partly passes.

In this way, the stirred-tank reactor according to the invention can be completely filled and can be operated under superatmospheric pressure. The pressure in the reactor is applied by the conveying members of the starting materials which, owing to their conveying properties, ensure that product from the reactor flows into the discharge pipe. Discharge pumps for the product mixture can therefore be dispensed with.

In an expedient variant of the stirred-tank reactor according to the invention, it is envisioned that at least one starting material feed into the reaction space is provided directly in the region of a stirrer shaft entry which is at the top in the position of use. For example, a starting material feed can be provided directly below an upper shaft packing.

In the case of hydrodynamically filled reactors, this makes it impossible for reaction product to enter the shaft seal. The lower part of the upper shaft seal is continuously cleared by flushing with the starting material stream. Hydrodynamically filled reactors is understood as meaning reactors which are completely filled with liquid, without a gas phase.

In a preferred variant, it is envisioned that the stirrer shaft forms a part of the bottom outlet at its end which is at the bottom in the position of use.

For example, the stirrer shaft may be formed, at least at its end which passes through the bottom outflow, as a hollow shaft which communicates with the reaction space.

It is particularly advantageous if the bottom outflow is in the form of a step bearing for the stirrer shaft.

In a further embodiment, the step bearing of the stirrer shaft may also be arranged by means of a bearing block at a certain height above the bottom outflow.

The advantages of the additional step bearing, as described below, are retained.

The step bearing which is expediently in the form of a sliding bearing may be cooled and lubricated by the reaction mixture.

It is possible for an expedient development of the stirred-tank reactor according to the invention to ensure that the bearing gap of the step bearing is dimensioned so that the reaction mixture can flow through it.

It is particularly advantageous if that end of the stirrer shaft which passes through the bottom outflow has a contour in the form of at least partly flattened bearing journals. Thus, the reaction mixture inevitably flows through the total step bearing including bearing gap.

Because the stirrer shaft additionally has a step bearing, it is possible to dimension the diameter of the shaft smaller than would be required in the case of stirrer shafts which are mounted only in a bearing which is at the top in the position of use. The step bearing is thus for avoiding inadmissibly large deflections of the shaft, for example when imbalances are introduced into the shaft owing to polymerisation deposits in the reactor.

In an advantageous variant of the stirred-tank reactor according to the invention, it is envisioned that the stirrer shaft has at least one outflow channel opening into the reaction space and extending at least partly transversely to the longitudinal axis thereof. The stirrer shaft which, at least at its lower end, is in the form of a hollow shaft can easily be provided with a transverse bore, for example above the step bearing.

The abovementioned object is furthermore achieved by a process for carrying out a polymerisation reaction from unsaturated monomers using a stirred-tank reactor described above, the process being distinguished in particular in that the feed of the starting materials and the discharge of the products are effected continuously into and out of the reactor.

The polymerisation is preferably carried out under superatmospheric pressure.

The superatmospheric pressure established may be, for example, a superatmospheric pressure of more than 5 bar relative to atmospheric pressure.

The reactor is expediently operated with hydrodynamic filling, i.e. the discharge of the product from the completely filled reactor is effected exclusively by the pressure of the starting materials introduced.

It is advantageous if, in addition to the metering of the starting material directly below the upper shaft seal, a further starting material stream is fed in. It is particularly advantageous if the further starting material streams are introduced by at least one metering lance into a central region of the reactor. This reliably avoids poorly mixed areas in which, for example, the initiator concentration is particularly low. Thus, a uniform distribution of the starting materials in the reactor can be achieved by means of a metering lance. This is important for the polymerisation particularly for rapidly decomposing initiators. In this case, rapidly decomposing means that the initiators have half-lives in the range of the mixing times of the stirrer. This means about 1-200 sec. On introduction of a portion of initiators, the segregation with respect to the initiator concentration in the reactor is minimised.

Owing to the hydrodynamic operation of the reactor according to the invention, there is in particular no need for complicated internals for transporting the reaction mixture, which internals would prevent the use of metering lances.

It is particularly expedient if the metering of the starting materials is effected at at least two points of the reactor which are spatially separated from one another. By distributing the metered stream over a plurality of metering points, better utilisation of the reaction volume is possible.

In continuously operated stirred-tank reactions for the polymerisation, it is generally not possible to utilise the total reactor volume homogeneously in equal parts as reaction space. The greater the viscosity differences between reactor metering and reactor content, the greater is the tendency to segregation. As a rule, poorly mixed areas occur at various points in the reactor, in the vicinity of the reactor wall or within the reaction mixture. By means of further metering points, the reaction volume effectively available is increased and the mixing paths are kept short. This effect is particularly pronounced when the time constants of the reaction are of the order of magnitude of the mixing time of the stirrer. In this case, the reactants are of better distributed over the reaction space before they react.

A part of the starting materials can be mixed together even before entering into the reaction space. For example, the initiator fed to the process can be introduced in pure form or as dilute solution before the reactor into the monomer metering pipe of the reactor. On the way to the reactor, the initiator is mixed in the monomer pipe. The metering point of the initiator is expediently a distance away from the reactor such that a homogeneous initiator/monomer mixture can form.

To improve the mixing in of the initiator, static mixers can be installed in the monomer metering pipe.

An advantage of this procedure is that the concentration gradients of the starting materials in the reactor are as small as possible.

Preferably, the jacket temperature of the reactor is adjusted so that it is at least 10° C. above the glass transition temperature of the polymer in the reaction solution. This reduces the tendency towards the formation of polymer deposits on cold reactor walls.

DESCRIPTION OF FIGURES

A working example of the stirred-tank reactor according to the invention is explained below with reference to the attached drawings.

FIG. 1 shows a schematic view of a stirred-tank reactor according to the invention.

FIG. 2 shows a section through the step bearing of the stirred-tank reactor according to the invention.

The stirred-tank reactor 1 shown in FIG. 1 comprises a preferably two-part reactor jacket 2 which encloses a reaction space 3. A stirrer shaft 4 which is nonrotatably connected to mixing and shearing elements 5 passes through the reaction space 3. The mixing and shearing elements 5 may be formed in a manner known per se as rods, helices or paddles.

The stirrer shaft 4 can be driven directly or indirectly; in the working example described, the stirrer shaft is driven directly by means of a motor 6 with an intermediate gear 7. Below the gear 7, the stirrer shaft 4 is sealed from the reaction space 3 by means of an axial face seal 8. In the working example described, the reactor jacket 2 is composed of two shells 9a and 9b which in each case are double-walled and are flanked together by an all-round flange 10 to give a seal.

During operation of the stirred-tank reactor 1, a heat exchange medium flows through the reactor jacket 9a, b, via which heat exchange medium thermostating of the reaction space 3 is achieved. This may be a heating or cooling medium, for example a thermostated fluid, such as steam, water, heat-transfer oil or another heat-transfer medium.

The stirrer shaft 4 is mounted at its end remote from the motor 6 in a step bearing 11 which simultaneously forms a central bottom outflow of the stirred-tank reactor 1. The formation of the step bearing 11 and of the stirrer shaft 4 in the region of the step bearing 11 is shown in FIG. 2.

Below, reference is first made to FIG. 2.

The end forming the bearing journals of the stirrer shaft 4 passes through an opening 12 in the reactor jacket 2, which opening forms the central bottom outflow of the stirred-tank reactor 1. The opening 12 simultaneously serves as a polymer discharge, as will be described below. Provided below this exit gap 13 is a sliding bush 14 which receives the stirrer shaft 4 so that a bearing gap 16 with customary dimensional tolerance forms. The diameter of the opening of the central product outflow and of the sliding bush 14 can therefore be identical or different.

That end 15 of the sliding bush 14 which is on the discharge side is in the form of a liquid outflow and is connected to a product discharge pipe (not shown).

That end of the stirrer shaft 4 which is partially mounted in the sliding bush 14 may have a constant diameter or may vary in diameter within the sliding bush 14. A change in the diameter of the sliding bush 14 in the axial direction is also conceivable. A further possibility is to form the end of the stirrer shaft 4 within the sliding bush as a bearing journal, where the stirrer shaft is provided circumferentially with one or more flushed areas.

The bearing gap 16 of the stirrer shaft permits, in the sliding bush, the lubrication and flushing of the bearing gap by means of the reaction product to be discharged.

In the region which passes through the step bearing 11, the stirrer shaft 4 is provided with an axial bore 17 which communicates with the reaction space 3 via a transverse bore 18. The reaction mixture is fed via the transverse bore 18 and the axial bore 17 within the shaft end and flows at the end out of the stirrer shaft 4 directly into a pipeline connected to an outflow connecting piece. The transverse bore 17 or transverse bores is or are present directly above the step bearing 11 or above the exit gap 13.

Below, reference is once again made to FIG. 1. The starting materials are introduced into the reaction space 3 in the stirred-tank reactor 1 via two metering points 19a, 19b. A first metering point 19a is present directly below the axial face seal 8. A second metering point 19b opens downstream of the first metering point 19a centrally in the reaction space 3. The second metering point 19b can be provided in the form of a metering lance which is not shown.

Monomer and/or solvent are fed to the stirred-tank reactor 1 via the pipe 20. A chain length regulator is added to the monomers via a first metering pump 21, and initiators which initiate the polymerisation are metered in via a second metering pump 22 arranged downstream. Downstream of the initiator metering, the starting material stream is branched. The feed into the reaction space 3 is effected via third and fourth metering pumps 23 and 24.

It is also conceivable to dispense with one or both metering pumps 23 and 24 and to adjust the distribution of the stream metered into the reactor by means of valves and/or correspondingly designed pipe cross sections. However, a disadvantage of this variant is that small deposits in the pipelines or valves leads to deviations of the desired ratio of the part-streams in the reactor. A further possibility is to monitor the starting material streams 19a and/or 19b via flow meters and to regulate them via control valves.

LIST OF REFERENCE NUMERALS

1 Stirred-tank reactor
2 Reactor jacket
3 Reaction space
4 Stirrer shaft
5 Mixing and shearing elements
6 Motor
7 Gear
8 Axial face seal
9a, b Shells
10 Flange
11 Step bearing
12 Opening
13 Exit gap
14 Sliding bush
15 End of the sliding bush
16 Bearing gap
17 Axial bore
18 Transverse bore
19a First metering point
19b Second metering point
20 Pipe
21 First metering pump
22 Second metering pump
23 Third metering pump
24 Fourth metering pump

The invention claimed is:

1. A stirred-tank reactor, comprising:
a thermostatable reactor jacket;
at least one driven stirrer shaft comprising a top portion and a bottom portion;
a stirring and/or shearing element nonrotatably connected to the stirrer shaft;
at least one starting material feed at a top position;
at least one product discharge which is at a bottom position; and
a sliding bush which receives the stirrer shaft so that a bearing gap is formed, wherein the stirrer shaft is lubricated and flushed with a reaction product,
wherein the product discharge is in the form of a central bottom outflow through which the stirrer shaft at least partly passes.

2. The reactor of claim 1, wherein at least one starting material feed into the reaction space is provided directly in the region of a stirrer shaft entry which is at a top position.

3. The reactor of claim 1, wherein the stirrer shaft forms a part of the bottom outflow at the bottom portion.

4. The reactor of claim 1, wherein the stirrer shaft is formed, at least at its end which passes through the bottom outflow, as a hollow shaft which communicates with the reaction space.

5. The reactor of claim 1, wherein the bottom outflow is in the form of a step bearing for the stirrer shaft.

6. The reactor of claim 5, wherein the bearing gap of the step bearing is dimensioned so that the reaction mixture can flow through it.

7. The reactor of claim 1, wherein an end of the stirrer shaft which passes through the bottom outflow has a contour in the form of at least partly flattened bearing journals.

8. The reactor of claim 1, wherein the stirrer shaft has at least one outflow channel opening into the reaction space and extending at least partly transversely to the longitudinal axis thereof.

9. A process for polymerizing at least one unsaturated monomer with the stirred-tank reactor of claim 1, the process comprising:

supplying a feed of at least one starting material into the reactor;

polymerizing the at least one starting material; and discharging at least one product out of the reactor.

10. The process of claim 9, wherein the polymerizing is carried out under superatmospheric pressure.

11. The process of claim 10, wherein a superatmospheric pressure, relative to atmospheric pressure, of greater than $\geqq 5$ bar is established.

12. The process of claim 10, wherein the reactor is operated with hydrodynamic filling.

13. The process of claim 10, wherein the supplying comprises metering of the at least one starting material into the reactor at least two points of the reactor which are spatially separated from one another.

14. The process of claim 10, wherein the at least one starting material is introduced via at least one metering lance into a central region of the reactor.

15. The process of claim 10, wherein flow through the reactor takes place in a direction of gravitational force on the at least one starting material and product.

16. The process of claim 10, wherein at least a part of the starting materials is mixed together before entering into a reaction space of the reactor.

17. The process of claim 10, wherein a jacket temperature of the reactor is adjusted so that it is at least 5° C. above a glass transition temperature of polymer of a reaction solution within the reactor.

18. The reactor of claim 1, wherein an outer diameter of the stirrer shaft does not increase between the top portion and the bottom portion of the stirrer shaft.

19. The reactor of claim 2, wherein the stirrer shaft is formed, at least at its end which passes through the bottom outflow, as a hollow shaft which communicates with the reaction space.

20. The reactor of claim 2, wherein the bottom outflow is in the form of a step bearing for the stirrer shaft.

\* \* \* \* \*